(12) United States Patent
Machado

(10) Patent No.: US 10,995,185 B2
(45) Date of Patent: May 4, 2021

(54) MASTERBATCH COMPOSITIONS HAVING TITANIUM DIOXIDE AND PROPYLENE-ETHYLENE COPOLYMER

(71) Applicant: ExxonMobil Chemical Patents Inc., Baytown, TX (US)

(72) Inventor: Martin Machado, Brussels (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 88 days.

(21) Appl. No.: 16/407,588

(22) Filed: May 9, 2019

(65) Prior Publication Data

US 2019/0367688 A1    Dec. 5, 2019

Related U.S. Application Data

(60) Provisional application No. 62/680,745, filed on Jun. 5, 2018.

(51) Int. Cl.
| | |
|---|---|
| *C08J 3/22* | (2006.01) |
| *C08L 23/14* | (2006.01) |
| *C08K 3/22* | (2006.01) |
| *C08K 5/00* | (2006.01) |
| *C08K 5/101* | (2006.01) |

(52) U.S. Cl.
CPC .......... *C08J 3/226* (2013.01); *C08K 3/22* (2013.01); *C08K 5/005* (2013.01); *C08K 5/101* (2013.01); *C08J 2323/16* (2013.01); *C08J 2423/06* (2013.01); *C08J 2423/12* (2013.01); *C08K 2003/2241* (2013.01)

(58) Field of Classification Search
None
See application file for complete search history.

(56) References Cited

U.S. PATENT DOCUMENTS

| | | | | |
|---|---|---|---|---|
| 6,410,614 | B1* | 6/2002 | Jones | C08K 3/22 523/205 |
| 7,338,995 | B2* | 3/2008 | May | C09C 1/3669 523/212 |
| 8,304,487 | B2* | 11/2012 | Malacarne | C08J 3/226 524/515 |
| 10,414,140 | B2* | 9/2019 | Zacarias | C08L 23/142 |
| 2008/0249211 | A1* | 10/2008 | Smink | C08J 3/226 523/351 |
| 2009/0220715 | A1* | 9/2009 | Werink | B29C 49/0005 428/35.7 |
| 2017/0368810 | A1* | 12/2017 | Zacarias | C08L 23/16 |
| 2019/0367688 | A1* | 12/2019 | Machado | C08K 5/101 |

FOREIGN PATENT DOCUMENTS

| | | | |
|---|---|---|---|
| WO | 2011/028206 A | 3/2011 | |
| WO | 2012/068703 A | 5/2012 | |
| WO | WO-2013134083 A1 * | 9/2013 | ............ D06N 3/045 |
| WO | 2016/137558 A | 9/2016 | |

* cited by examiner

*Primary Examiner* — Peter A Salamon

(57) ABSTRACT

Wax-free masterbatch compositions and methods of formulation thereof for use in the production of various end-use plastic products. The wax-free masterbatch compositions may comprise at least titanium dioxide and propylene-ethylene copolymer, and optionally, a carrier resin. The propylene-ethylene copolymer may have about 6% to about 20% by weight ethylene content.

15 Claims, 5 Drawing Sheets

MASTERBATCH COMPOSITIONS HAVING TITANIUM DIOXIDE AND PROPYLENE-ETHYLENE COPOLYMER

CROSS-REFERENCE TO RELATED APPLICATIONS

This application claims priority to U.S. Ser. No. 62/680,745, filed Jun. 5, 2018, herein incorporated by reference.

FIELD

This application relates to masterbatch compositions and, in particular, to wax-free masterbatch compositions comprising titanium dioxide and propylene-ethylene copolymer, end-use polymer compositions and products thereof, and methods related thereto.

BACKGROUND

Raw material compositions for use in forming end-use plastic products are often in the form of a masterbatch (MB), although some liquid concentrates at room temperature (RT) do exist. Masterbatches are concentrated mixtures of pigments and/or other additives encapsulated in a pelletized carrier resin. Masterbatches may be used to allow manufactures to perform large-scale production (e.g., large processors, extruders, and the like) at lower cost, permit ease of blending with other materials (e.g., resins), ensure uniform color realization, reduce potential health risks associated with powder pigments as they are dust- and dirt-free, reduce manufacturing waste, and the like.

Conventional masterbatch formulations comprise at least one polymer acting as the carrier resin, at least one pigment and/or other additive, and typically a processing wax acting as a processing aid and dispersing agent. The components of the formulation are generally melt-blended (or compounded) in an extruder (e.g., a twin-screw extruder) and pelletized to form the masterbatch, which is then packaged for commercialization or used in direct formation of an end-use product. The carrier resin is typically selected based on the particular let-down resin (or "host polymer") selected for the end-use product, although one or more universal carriers may additionally be available which are designed to be compatible with an assortment of let-down resins. The processing wax is a low viscosity, low molecular weight wax conventionally included in masterbatch compositions to reduce clogging of filter materials and lower the melt pressure for masterbatch formation, permitting a less cost-intensive and more stable compounding operation. These processing waxes may be polyethylene waxes, polypropylene waxes, oxidized waxes, grafted waxes, and the like, with viscosities of less than about 450 Pa·s at 190° C. and molecular weights of less than about 8,000 gram per mole (g/mol).

The processing waxes traditionally found in masterbatches are often more expensive than the carrier resin itself and introduce an additional component to the masterbatch that can affect the physical properties of a final end-use product. It is desirable to minimize non-compatible materials forming the masterbatch so as to minimize the potential of the masterbatch being incompatible with the let-down resin and thus minimize the impact on the physical properties of the end-use product. These low viscosity, low molecular weight processing waxes may further impact the end-use product due to the limited structural integrity of the molecules forming the processing wax or may migrate to the surface of an end-use product affecting, for example, surface finishing or printing.

SUMMARY

The present disclosure provides a wax-free masterbatch composition comprising titanium dioxide and propylene-ethylene copolymer. The use of the propylene-ethylene copolymer delivers desirable viscosity modification, wetting, distribution of included pigments and/or other additives, and let-down resin compatibility, among other characteristics, without the use of a wax.

In one or more aspects, the present disclosure provides a masterbatch composition comprising about 30% to about 85% by weight titanium dioxide; about 2% to about 20% by weight of a propylene-ethylene copolymer, the copolymer comprising about 6% to about 20% by weight ethylene content; and, optionally, a polyolefin carrier resin. The masterbatch composition is free of a processing wax.

In one or more aspects, the present disclosure provides an end-use polymer composition including a masterbatch composition and a polyolefinic host polymer. The masterbatch composition of the end-use polymer composition comprises about 30% to about 85% by weight (wt. %) titanium dioxide; about 2% to about 20% by weight of a propylene-ethylene copolymer, the copolymer comprising about 6% to about 20% by weight ethylene content; optionally, a polyolefin carrier resin; and is free of a processing wax.

In one or more aspects, the present disclosure provides a method of forming a masterbatch composition comprising melt-compounding a mixture of about 30% to about 85% by weight titanium dioxide; about 2% to about 20% by weight of a propylene-ethylene copolymer, the copolymer comprising about 6% to about 20% by weight ethylene content; and optionally, a polyolefin carrier resin. The melt-compounding is performed in the absence of a processing wax.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
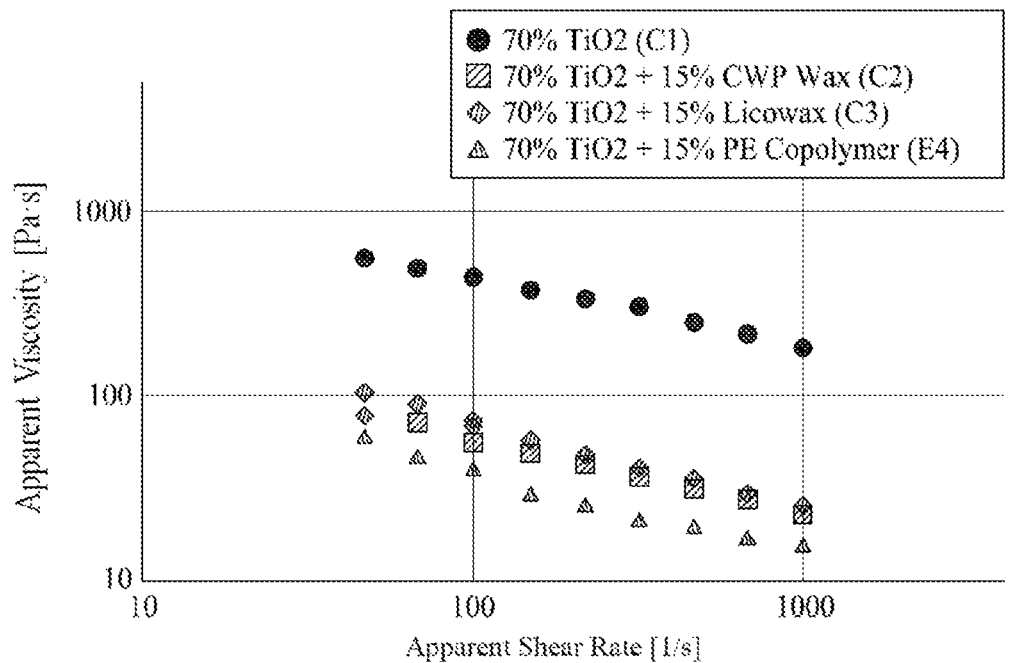
FIGS. 1-3 show apparent viscosity values for masterbatch compositions prepared according to one or more embodiments of the present disclosure and comparative masterbatch formulations.

Various pigment additives are included in a masterbatch in order to achieve various desired qualities, most prominently to achieve a desired color quality. These pigment additives (or simply "pigments") are substantially uniformly dispersed in a molten carrier resin matrix during production of the masterbatch. White pigmented masterbatches are often desired for white end-use products (e.g., plastic products, such as electrical appliance plastic products, automobile plastic products, and the like), as a universal masterbatch for which other additives may be included (e.g., other colored pigments), and the like.

Titanium dioxide is an inorganic white pigment that efficiently scatters visible light, allowing it to impart whiteness, brightness, and high opacity to a masterbatch, which can be used for the formation and coloring of an array of end-use plastic products. Its pigment performance allows for high covering power, brightness, and high opacity white masterbatches. Besides its pigment performance, titanium dioxide can be used to impart a number of other attributes to a masterbatch and the resultant final end-use product. Specifically, titanium dioxide can enhance heat resistance, light resistance (i.e., through absorption of UV light), and weather resistance, thereby additionally improving the durability and usability of various plastic parts (e.g., minimizing or reducing UV infiltration into perishable products, such as dairy products).

The present disclosure relates to wax-free masterbatch compositions comprising titanium dioxide and propylene-ethylene copolymer, end-use polymer compositions and products thereof, and methods related thereto. As described hereinbelow, it was determined that processing waxes can be removed from a titanium dioxide-containing masterbatch by inclusion of propylene-ethylene copolymers, alone or in combination with a polyolefinic carrier resin. The presence of the propylene-ethylene copolymer(s) reduce the masterbatch viscosity, similar to traditional processing waxes, to enhance processing (e.g., melt-compounding), handling, and reduce costs. Indeed, inclusion of the propylene-ethylene copolymer in the wax-free masterbatches of the present disclosure may yield equivalent viscosity modification (i.e., reduction). The wax-free masterbatches having titanium dioxide and propylene-ethylene copolymer further exhibit comparable or improved color, opacity, and rheological properties compared to use of traditional processing wax. Because the processing wax is excluded from the masterbatch compositions disclosed herein, it cannot impart non-compatibility with a host polymer or let-down resin. Moreover, because the copolymers of the instant disclosure are composed of propylene and ethylene, the masterbatch compositions made therewith have enhanced compatibility with polyolefinic host polymers having both propylene and ethylene. Accordingly, the propylene-ethylene copolymer described herein can replace the use of traditional processing waxes wholly, and further, can themselves act as a carrier resin, if desired.

One or more illustrative embodiments incorporating the embodiments of the present disclosure are included and presented herein. Not all features of a physical implementation are necessarily described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related, and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as physical properties, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. Where the term "less than about" or "more than about" is used herein, the quantity being modified includes said quantity, thereby encompassing values "equal to." That is "less than about 3.5%" includes the value 3.5%.

While compositions and methods are described herein in terms of "comprising" various components or steps, the compositions and methods can also "consist essentially of" or "consist of" the various components and steps.

As used herein, "consisting essentially of" means that the composition referred to has no more than 1 wt % or 0.5 wt % or 0.1 wt % of "wax" or other processing aids designed to alter the melt pressure of the composition. A processing wax includes those materials known in the commercial masterbatch arts such as a low viscosity, low molecular weight polymers or oligomers used to reduce clogging of filter materials and lower the melt pressure for masterbatch formation, permitting a less cost-intensive and more stable compounding operation. These processing waxes include polyethylene waxes, polypropylene waxes, oxidized waxes, grafted waxes, and the like, with viscosities of less than about 450 Pa·s at 190° C. and molecular weights of less than about 8,000 gram per mole (g/mol).

Various terms as used herein are defined below. To the extent a term used in a claim is not defined below, it should be given the broadest definition persons in the pertinent art have given that term as reflected in one or more printed publications or issued patents.

As used herein, the term "masterbatch," and grammatical variants thereof, refers to a concentrated composition of a mixture of pigment additives and/or other additives encapsulated during a heat process into a polymer matrix. The masterbatch may thereafter be cooled and cut into various shapes, such as granular or pellet shapes. The masterbatch compositions of the present disclosure comprise at least titanium dioxide and propylene-ethylene copolymer.

As used herein, the term "titanium dioxide," and grammatical variants thereof, refers to an oxide of titanium having the chemical formula TiO2. As a pigment in a masterbatch, titanium dioxide may additionally be referred to by one of skill in the art as titanium white, Pigment White 6 (PW6), or CC77891.

As used herein, the term "additive," and grammatical variants thereof, refers to a substance added to a masterbatch composition in order to provide a specific functionality or characteristic. Examples of such additives include, but are not limited to, a pigment, an antioxidant, a light stabilizer, a nucleating agent, a slip agent, an antiblocking agent, a lubricant, an antistatic agent, a molecular weight modifier, a dispersing aid, and the like, and any combination thereof.

As used herein, the term "pigment," and grammatical variants thereof, refers to an additive that imparts color to a masterbatch, and may be an organic or inorganic compound. The pigment for use in the embodiments of the present disclosure may be titanium dioxide for imparting whiteness to the masterbatch compositions described herein.

As used herein, the term "antioxidant," and grammatical variants thereof, refers to an additive added to reduce or prevent polymer degradation caused by oxidation.

As used herein, the term "polymer," and grammatical variants thereof, refers broadly to include homopolymers and copolymers of two, three or more different monomers.

As used herein, the term "copolymer," and grammatical variants thereof, refers to polymers of two or more different monomers.

As used herein, the term, "propylene-ethylene copolymer," and grammatical variants thereof, refers to a copolymer having at least monomers of propylene ($C_3H_6$) and ethylene ($C_2H_4$). In some embodiments, the propylene-ethylene copolymer of the present disclosure may comprise an amorphous ethylene propylene matrix laced with a network of fine, well-dispersed isotactic polypropylene. Such propylene-ethylene copolymers exhibit elasticity, flexibility, and impact toughness.

As used herein, the term "polyolefin," and grammatical variants thereof, refers to any group of polymers obtained from the polymerization of an olefin or alkene monomer. Examples of polyolefins include, but are not limited to polyethylene, polypropylene, polybutene, and the like, and any combination thereof.

As used herein, the term "carrier resin," and grammatical variants thereof, refers to any polymer capable of stably encapsulating concentrated components of a pigment and/or other additive to produce a masterbatch. In the embodiments of the present disclosure, the carrier resin may be any polymer capable of stably encapsulating at least titanium dioxide and propylene-ethylene copolymer. In alternate embodiments, the propylene-ethylene copolymer described herein acts as a carrier resin alone or in combination with another polymer for forming the masterbatch of the present disclosure.

As used herein, a composition "free of" a component, and grammatical variants thereof, refers to a composition substantially devoid of the component, or comprising the component in an amount of less than about 0.01 weight percent (wt. %) by weight of the total composition.

As used herein, the term "processing wax," and grammatical variants thereof, refers to a low viscosity, low molecular weight wax conventionally included in masterbatch compositions to reduce clogging of filter materials and lower the melt pressure for masterbatch formation, having viscosities of less than about 450 Pa·s at 190° C. and molecular weights of less than about 8,000 gram per mole (g/mol).

As used herein, the term "host polymer," and grammatical variants thereof, refers to polymer compatible with and mixed with a masterbatch to form an "end-use polymer composition." The term "host polymer" is synonymous with the terms "let-down resin" or "let-down polymer."

As used herein, the terms "end-use polymer composition" and "end-use polymer," and grammatical variants thereof, refer to a mixture of at least a masterbatch and host polymer, including any additional additives, for use in forming a plastic product, such as by molding or otherwise forming said product (or part).

As provided above, the present disclosure provides for a masterbatch composition comprising at least titanium dioxide and propylene-ethylene copolymer, and optionally a carrier resin and/or additive(s), wherein the composition is free of a processing wax.

The masterbatch composition described herein may be produced by melt-compounding the ingredients of the composition including the titanium dioxide and propylene-ethylene copolymer, as well as any optional carrier resin and/or additive(s). As used herein, the term "melt-compounding," and grammatical variants thereof, refers to a process of blending by supplying heat and melting ingredients together. The various ingredients may be pre-mixed or mixed during the melt-compounding process, without departing from the scope of the present disclosure. For example, the ingredients may be supplied to a batch or continuous mixer (e.g., a twin-screw extruder) and compounded at a temperature above the melting point of the propylene-ethylene copolymer and, when included, the carrier resin, generally below about 210° C., such as from about 100° C. to about 210° C. to form a molten homogeneous mixture. The molten mixture may then be extruded through a die, cooled, and cut into pellets, granules, or any other desired shape.

The titanium dioxide for use in the present disclosure may be any commercially available source of titanium dioxide, including natural titanium dioxide (e.g., sourced from rutile, brookite, anatase, and the like) and/or synthetic titanium dioxide. Preferably, the titanium dioxide selected is substantially pure, such as having a purity of greater than about 80%, or about 85%, or about 90%, or about 95% titanium dioxide and does not contain additional elements or impurities that will adversely influence formation of the masterbatch or the end-use polymer composition. Generally, the titanium dioxide is in the form of a fine, dry powder. Examples of suitable commercially available titanium dioxide for use in the embodiments described herein may include, but are not limited to TI-PURE™ grades available from The Chemours Company in Wilmington, Del., such as TI-PURE™ R-104.

The titanium dioxide may be included in the masterbatch compositions of the present disclosure in an amount sufficient to impart the desired physical properties (e.g., whiteness, opacity, durability, and the like) to an end-use polymer composition (having been mixed with a host polymer). In some embodiments, the titanium dioxide may be included in the masterbatch compositions of the present disclosure in an amount of about 30% to about 85% by weight of the composition, encompassing any value and subset therebetween, such as about 35% to about 85%, or about 40% to about 85%, or about 55% to about 85%, or about 60% to about 85%, or about 70% to about 85% by weight of the composition. In some specific embodiments, the titanium dioxide may be present in the masterbatch composition of about 50% to about 80%, or about 70% to about 80%, or about 80%, or about 70% by weight of the composition, encompassing any value and subset therebetween.

The propylene-ethylene copolymer for use in the embodiments of the present disclosure comprises monomers of propylene and ethylene. In some embodiments, the ethylene is copolymerized with propylene, so that the copolymer includes propylene units (units on the polymer chain derived from propylene monomers) and ethylene units (units on the polymer chain derived from ethylene monomers).

The propylene-ethylene copolymer may comprise an ethylene content of about 2% to about 20% by weight of the composition, encompassing any value and subset therebetween, such as about 2% and about 16%, or about 4% and about 16%, or about 6% to about 12%, or about 6% to about 10%, or about 6% to about 8% by weight of the composition. In some specific embodiments, the propylene-ethylene copolymer may comprise an ethylene content of about 4% to about 16%, or about 5% to about 16%, or about 6%, or about 5% by weight of the composition, encompassing any value and subset therebetween.

The propylene-ethylene copolymer described herein may have an average molecular weight of greater than about 10,000 g/mol, or at least greater than that of traditional processing waxes of which the masterbatch compositions described herein are free. In some embodiments, the propylene-ethylene copolymer may have a molecular weight of about 10,000 g/mol to about 5,000,000 g/mol, encompassing any value and subset therebetween, such as 10,000 g/mol to about 2,500,000 g/mol; or about 10,000 g/mol to about 1,000,000 g/mol; or about 10,000 g/mol to about 500,000 g/mol; or about 10,000 g/mol to about 50,000 g/mol. In some specific embodiments, the propylene-ethylene copolymer may have a molecular weight of about 10,000 g/mol to about 100,000 g/mol; or about 10,000 g/mol to about 80,000 g/mol; or about 10,000 g/mol to about 50,000 g/mol; or about 10,000 g/mol to about 20,000 g/mol, encompassing any value and subset therebetween. In another specific embodiment, the propylene-ethylene copolymer may have a molecular weight of about 10,200 g/mol.

Unexpectedly, the propylene-ethylene copolymers of the present disclosure are able to achieve desirable viscosity modification to enhance processing, handling, and reduce costs, even though the viscosities of the copolymers are higher than traditional processing waxes, as discussed in detailed hereinbelow. The polypropylene-ethylene copolymers may have a complex viscosity of greater than about 500 Pascal-second (Pa·s) at 190° C., or at least greater than that of traditional processing waxes of which the masterbatch compositions described herein are free. In some embodiments, the polypropylene-ethylene copolymers may have a complex viscosity of about 500 Pa·s to about 10,000 Pa·s at 190° C., encompassing any value and subset therebetween, such as from about 500 Pa·s to about 5,000 Pa·s; or about 500 Pa·s to about 2,500 Pa·s; or about 1,000 Pa·s to about 2,000 Pa·s at 190° C. In some specific embodiments, the propylene-ethylene copolymer may have a complex viscosity of about 1,000 Pa·s to about 1,500 Pa·s; or about 1,200 Pa·s to about 1,300 Pa·s; or about 1,300 Pa·s; or about 1,200 Pa·s at 190° C., encompassing any value and subset therebetween.

Examples of suitable commercially available propylene-ethylene copolymer for use in the embodiments of the present disclosure may include, but are not limited to, VISTAMAXX™ polymers available from ExxonMobil Chemical Company in Houston, Tex., such as VISTAMAXX™ 8800.

The masterbatch composition (as well as the end-use polymer) comprising titanium dioxide and propylene-ethylene copolymer may exhibit desired whiteness, as measured by the CIELAB color scale. The CIELAB color scale describes mathematically perceivable colors in three dimensions: $L^*$ for lightness, where 100 represents white and 0 represents black; $a^*$ for green-red color components, where negative values indicate greenness and positive values indicate redness; and $b^*$ for blue-yellow color components, where negative values indicate blueness and positive values indicate yellowness. In some embodiments, the masterbatch composition (as well as the end-use polymer) comprising titanium dioxide and propylene-ethylene copolymer may exhibit CIELAB color coordinate of $L^*$ of greater than about 95, such as about 95 to about 98, encompassing any value and subset therebetween.

The titanium dioxide and propylene-ethylene copolymer may together form the entirety of the masterbatch composition. That is, the propylene-ethylene copolymer may act as the carrier resin and further impart various comparable or improved characteristics of traditional processing waxes, without the presence of any processing wax. In other embodiments, an optional carrier resin may be included to form the masterbatch in combination with at least the titanium dioxide and propylene-ethylene copolymer. In such embodiments, the propylene-ethylene copolymer and carrier resin may together act as the masterbatch encapsulant polymer (collectively act as a carrier resin), without departing from the scope of the present disclosure. Factors that may affect inclusion of the optional carrier resin may include, but are not limited to, cost considerations (e.g., the propylene-ethylene copolymer may be more expensive than similar amounts of carrier resin), the desired properties to be imparted by the propylene-ethylene copolymer (e.g., adjusting the concentration may be used to adjust the properties of the masterbatch and resultant end-use polymer composition), and the like.

The carrier resin may be a polyolefin carrier resin, such as polyethylene, polypropylene, polybutene, a poly-α-olefin copolymer, random copolymer polypropylene, propylene based elastomers (PBE), ethylene α-olefin copolymers (e.g., where the alpha-olefin comonomer of the ethylene has 12 carbon atoms or less, e.g., C3-C12 α-olefin), ethylene propylene copolymers, ethylene-α-olefin and polyene terpolymers (e.g., those having a C3-C12 α-olefin, such as ethylene propylene diene terpolymers (EPDM)), and the like, and any combination thereof. In some specific embodiments, the carrier resin may be or comprise polyethylene, polypropylene, or a combination thereof.

When included, the amount of carrier resin in the masterbatch may be present in a ratio of about 0.5:1 carrier resin:copolymer to about 3:1 carrier resin:copolymer, encompassing any value and subset therebetween, such as from about 0.5:1 to about 2:1, or about 0.5:1 to about 1:1, or about 1:1 to about 2.5:1, or about 1:1 to about 2:1, or about 1:1 to about 3:1, or about 2.5:1 to about 3:1 carrier resin:copolymer. In other embodiments, the amount of carrier resin in the masterbatch may be present in a ratio of about 3:1 to about 9:1 carrier resin:titanium dioxide, encompassing any value and subset therebetween, such as 3:1 to about 8.5:1, or about 3:1 to about 8:1, or about 3.5:1 to about 8:1, or about 4:1 to about 8:1 carrier resin:titanium dioxide.

Examples of suitable commercially available carrier resins for use in the embodiments of the present disclosure may include, but are not limited to, LLDPE linear low density polyethylene resins available from ExxonMobil Chemical Company in Houston, Tex., such as LLDPE LL 6101XR.

In one or more embodiments of the present disclosure, the masterbatch compositions described herein may further comprise an additive. Such additives may include, but are not limited to, an antioxidant, a light stabilizer, a nucleating agent, a slip agent, an antiblocking agent, a lubricant, an antistatic agent, a molecular weight modifier, a dispersing aid, and any combination thereof.

An antioxidant may be included in the masterbatch composition to reduce or prevent polymer degradation due to oxidation. The selected antioxidant may include, but is not limited to, a phenolic antioxidant. Examples of suitable phenolic antioxidants may include, but are not limited to, octadecyl-3-(3,5-di-tert.butyl-4-hydroxyphenyl)-propionate; 2,6-di-tert-butyl-4-methylphenol; pentaerythritol-tetrakis-(3,5-di-t-butyl-4-hydroxyphenyl) propionate; 4,4'-methylenebis(2,6-di-tert-butylphenol); tris(3,5-di-tert-butyl-4-hydroxybenzyl) isocyanurate; alkylphenol disulfide; and the like; and any combination thereof.

When included, the antioxidant may be present in the masterbatch compositions of the present disclosure in an amount of about 0.01% to about 0.5% by weight of the composition, encompassing any value and subset therebetween, such as about 0.01% to about 0.25%, or about 0.01% to about 0.1%, or about 0.01% to about 0.05% by weight of the composition. In some specific embodiments, the antioxidant may be present in the masterbatch composition in an amount of about 0.02% by weight of the composition.

Examples of suitable commercially available phenolic antioxidants may include, but are not limited to, IRGANOX™ grade antioxidants available from Ciba Specialty Chemicals, Inc. in Basel, Switzerland, such as IRGANOX™ 1076.

The wax-free masterbatch compositions of the present disclosure including titanium dioxide and propylene-ethylene copolymer, and optionally a carrier resin and/or one or more additives, exhibits an apparent viscosity of less than about 10,000 Pa·s at a shear rate of 100 s-1, encompassing any value and subset therebetween greater than 0 Pa·s. The apparent viscosity of the masterbatch composition may depend on a number of factors including, but not limited to, the type and amount of carrier resin, the type and amount of propylene-ethylene copolymer, and the like. For example, a carrier resin characterized by highly filled, very low melt index may result in increased apparent viscosities. In some embodiments, the masterbatch compositions have an apparent viscosity of about 15 Pa·s to about 10,000 Pa·s at a shear rate of 100 s−1, encompassing any value and subset therebetween, such as about 20 Pa·s to about 5,000 Pa·s; or about 20 Pa·s to about 1,000 Pa·s; or about 20 Pa·s to about 500 Pa·s; or about 30 Pa·s to about 120 Pa·s at 100 s−1. In some specific embodiments, the apparent viscosity of the masterbatch compositions described herein may be less than about 110 Pa·s, or about 110 Pa·s to about 15 Pa·s at a shear rate of 100 s−1, encompassing any value and subset therebetween.

The masterbatch composition of the present disclosure may be diluted (let-down) by mixing with a compatible host polymer by any method including melt-blending, as described above, at a temperature above the melt temperature of the masterbatch composition (e.g., the melt temperature of the propylene-ethylene copolymer and the optional carrier resin) and the host polymer to form the end-use polymer composition described herein.

The host polymer may be a polyolefin host polymer composed of any one or combination of the polyolefin polymers described hereinabove for use as the optional carrier resin of the masterbatch composition, without limitation. In some embodiments, the host polymer comprises one or both of propylene and ethylene, such as a polypropylene random copolymer, a polypropylene homopolymer, a polyethylene homopolymer, and the like, and any combination thereof. In one or more embodiments, the end-use polymer comprises the masterbatch composition in an amount of about 0.5% to about 20% by weight of the end-use polymer (i.e., the masterbatch composition and the host polymer), encompassing any value and subset therebetween, such as about 0.5% to about 15%, or about 1% to about 10%, or about 2% to about 5%, or about 3% to about 5% by weight of the end-use polymer. In some specific embodiments, the end-use polymer comprises the masterbatch composition in an amount of about 3% to about 5%, or about 5%, or about 3% by weight of the end-use polymer, encompassing any value and subset therebetween.

Examples of suitable commercially available host polymers may include, but are not limited to polypropylene homopolymers and copolymers available from ExxonMobil Chemical Company in Houston, Tex., such as PP9074MED (a polypropylene (PP) random copolymer), PP3155 (a PP homopolymer), and/or LLDPE LL 6101XR (a linear low-density polyethylene).

The end-use polymer composition of the present disclosure comprising the titanium dioxide/propylene-ethylene copolymer masterbatch composition may be used in forming any variety of plastic products, where the particular characteristics of the end-use polymer (and thus plastic product) may be adjusted by adjusting the various types and concentrations of the masterbatch and host polymer. In some embodiments, the end-use polymer exhibits a notched Izod strength impact value at room temperature or at −20° C. greater than the end-use polymer composition free of the propylene-ethylene copolymer in the masterbatch composition. Indeed, as described hereinbelow, the notched Izod strength impact value may be improved (higher) than that of host polymer itself and/or masterbatch formulations comprising traditional processing waxes.

It is to be understood that the particular notched Izod impact strength value of an end-use composition may depend in large part on the particular host polymer selected and the composition and concentration of the masterbatch compositions of the present disclosure (and any carrier resin and/or additives), among other factors. In some embodiments, as a nonlimiting example, the end-use polymer composition may have a notched Izod impact value at RT of about 5 kilojoules per square meter (kJ/m2) to about 45 kJ/m2, or about 5 kJ/m2 to about 40 kJ/m2, encompassing any value and subset therebetween. In some embodiments, as a nonlimiting example, the end-use polymer composition may have a notched Izod impact value at −20° C. of about 1 kJ/m2 to about 20 kJ/m2, or about 2 kJ/m2 to about 15 kJ/m2, encompassing any value and subset therebetween.

The end-use polymer compositions of the present disclosure may further exhibit various additional physical properties, such as elastic modulus, yield point, elongation at yield, tensile strength, and elongation at break, as described hereinbelow. Similar to impact strength, it is to be understood that the particular physical properties of an end-use composition may depend in large part on the particular host polymer selected and the composition and concentration of the masterbatch compositions of the present disclosure (and any carrier resin and/or additives), among other factors. In some embodiments, as nonlimiting examples, the end-use polymer compositions of the present disclosure may have an elastic modulus of about 250 MPa to about 2000 MPa, a yield point of about 5 MPa to about 40 MPa, an elongation at break of about 5% to about 20%, a tensile strength of about 5 MPa to about 25 MPa, and an elongation at break of about 100% to about 700%, each encompassing any value and subset therebetween.

Embodiments and Examples disclosed herein include:

Example A

A composition comprising: about 30% to about 85% by weight titanium dioxide; about 2% to about 20% by weight of a propylene-ethylene copolymer, the copolymer comprising about 2% to about 20% by weight ethylene content; and optionally, a polyolefin carrier resin, wherein the composition is free of a processing wax.

Example B

An end-use polymer comprising a composition of about 30% to about 85% by weight titanium dioxide, about 2% to about 20% by weight of a propylene-ethylene copolymer, the copolymer comprising about 2% to about 20% by weight ethylene content, optionally, a polyolefin carrier resin, wherein the composition is free of a processing wax; and a polyolefin host polymer.

Example C

A method of preparing a composition comprising melt-compounding a mixture of: about 30% to about 85% by weight titanium dioxide; about 2% to about 20% by weight of a propylene-ethylene copolymer, the copolymer comprising about 6% to about 20% by weight ethylene content; and optionally, a polyolefin carrier resin, wherein the composition is free of a processing wax.

Each of Embodiments and Examples A, B, and C may have one or more of the following additional elements in any combination:

Element 1: Wherein the composition comprises about 70% to about 80% by weight titanium dioxide.

Element 2: Wherein the copolymer comprises about 4% to about 16% by weight ethylene content.

Element 3: Wherein the copolymer comprises about 6% by weight ethylene content.

Element 4: Wherein the copolymer has a viscosity of greater than about 500 Pa·s at 190° C.

Element 5: Wherein the copolymer has a viscosity of about 1,200 Pa·s at 190° C.

Element 6: Wherein the copolymer has a molecular weight of greater than about 10,000 g/mol.

Element 7: Wherein the copolymer has a molecular weight of about 10,200 g/mol.

Element 8: Wherein the composition includes the polyolefin carrier resin and the included polyolefin carrier resin is polyethylene.

Element 9: Wherein the composition further comprises an additive selected from the group consisting of an antioxidant, a light stabilizer, a nucleating agent, a slip agent, an antiblocking agent, a lubricant, an antistatic agent, a molecular weight modifier, a dispersing aid, and any combination thereof.

Element 10: Wherein the composition includes an antioxidant and the included antioxidant is a phenolic antioxidant.

Element 11: Wherein the composition includes an antioxidant and the antioxidant is octadecyl-3-(3,5-di-tert.butyl-4-hydroxyphenyl)-propionate.

Element 12: Wherein the apparent viscosity of the composition is less than about 10,000 Pa·s at a shear rate of 100 s−1.

Element 13: Wherein the apparent viscosity of the composition is in the range of about 110 Pa·s to about 15 Pa·s at a shear rate of 100 s−1.

Element 14: Wherein the composition has CIELAB color coordinate L* of greater than about 95.

Element 15: The end-use polymer, wherein the composition is present in the range of about 0.5% to about 20% by weight of the end-use polymer.

Element 16: The end-use polymer, wherein the composition is present in an amount of about 3% to about 5% by weight of the end-use polymer.

Element 17: The end-use polymer, wherein the polyolefinic host polymer comprises one or both of propylene and ethylene.

Element 18: The end-use polymer, wherein the end-use polymer has a notched Izod impact value at room temperature greater than the end-use polymer free of the propylene-ethylene copolymer in the composition.

Element 19: The end-use polymer, wherein the end-use polymer has an opacity greater than the end-use polymer free of the propylene-ethylene copolymer in the composition.

Element 20: The end-use polymer, wherein a thickness of about 0.5 mm of the end-use polymer has an opacity characterized by a transmittance of less than 15% across visible spectrum.

Element 21: The end-use polymer, wherein the thickness of the end-use polymer has opacity characterized by a transmittance of less than 12% across visible spectrum.

By way of non-limiting example, exemplary combinations applicable to A, B, and C include: Examples A, B, and C and any one, or more, or all of Elements 1, 2, 3, 4, 5, 6, 7, 8, 9, 10, 11, 12, 13, 14, 15, 16, 17, 18, 19, 20, and/or 21; Example A and any one, or more, or all of Elements 1, 2, 3, 4, 5, 6, 7, 8, 9, 10, 11, 12, 14, and/or 14; Example B and any one, or more, or all of Elements 15, 16, 17, 18, 19, 20, and/or 21; Example B and any one, or more, or all, of Elements 1, 2, 3, 4, 5, 6, 7, 8, 9, 10, 11, 12, 14, and/or 14; Example C and any one, or more, or all of Elements 1, 2, 3, 4, 5, 6, 7, 8, 9, 10, 11, 12, 14, and/or 14.

To facilitate a better understanding of the embodiments of the present disclosure, the following examples of preferred or representative embodiments are given. In no way should the following examples be read to limit, or to define, the scope of the disclosure.

EXAMPLES

Examples 1-12 described below are directed to various masterbatch compositions prepared according to the embodiments described herein (i.e., comprising titanium dioxide and propylene-ethylene copolymer) and comparative formulations (i.e., comprising titanium dioxide and traditional processing waxes). Each of examples 1-12 include a combination of the following ingredients as shown in Table 1:

TABLE 1

| Ingredient | Ingredient Type | Commercial Name | Reference Name |
|---|---|---|---|
| Titanium Dioxide | Pigment Additive | TI-PURE ™ R-104 (The Chemours Co.) | TiO$_2$ |
| Low-Density Polyethylene | Carrier Resin | LLDPE LL 6101XR (ExxonMobil Chemical Co.) | Carrier Resin |
| Polyethylene Wax | Processing Wax 1 | CWP 400E (Trecora Chemical) | Wax 1 |
| Polyethylene Wax | Processing Wax 2 | LICOWAX ™ PE 520GR (Clariant International Ltd.) | Wax 2 |

TABLE 1-continued

| Ingredient | Ingredient Type | Commercial Name | Reference Name |
|---|---|---|---|
| Propylene-Ethylene Copolymer | Processing Aid and/or Carrier Resin | VISTAMAXX ™ 8800 (ExxonMobil Chemical Co.) | PE Copolymer |
| Phenolic Propionate | Antioxidant Additive | IRGANOX ™ 1076 (Ciba Specialty Chemicals) | Antioxidant |

The selected Carrier Resin (LLDPE LL 6101XR) has a density of 0.924 grams per cubic centimeter (g/cm3) as determined by ASTM D1505 and a melt index of 20 grams per 10 minutes (g/min) at 190° C. as determined by ASTM D1238. The properties of the Wax 1, Wax 2, and PE Copolymer are compared in Table 2, including their physical form, number average molecular weight (Mn), polydispersity index (Mn/Mw, where Mw is weight average molecular weight), and complex viscosity at 190° C., as follows.

TABLE 2

| Reference Name | Mn (g/mol) | Mn/Mw | Complex Viscosity (Pa · s) |
|---|---|---|---|
| Wax 1 | 600 | 3.0 | 56 |
| Wax 2 | 1,900 | 3.3 | 269 |
| Propylene-Ethylene (PE) Copolymer | 10,200 | 2.6 | 1,296 |

As shown in Table 2, the number average molecular weight and complex viscosity are orders of magnitude larger for the PE Copolymer than either traditional processing wax, Wax 1 and Wax 2. As will be shown hereinbelow, this difference did not adversely influence any of the masterbatch compositions prepared using the PE Copolymer.

The formulations of examples 1-12 are provided in Table 4, where the examples are designated with a "C" to connote a comparative example and an "E" to connote an experimental example of a masterbatch composition prepared in accordance with the present disclosure (i.e., included propylene-ethylene copolymer), and wherein each value is in wt. % or parts per million (ppm). The symbol "-" indicates that the particular component was excluded from the example. The formulations where melt-compounded using a Coperion™ ZSK 26 MC18 twin-screw extruder with a screw diameter of 26 mm and L/D ratio of 52. The screw design included three kneading sections. Processing conditions are detailed in Table 4.

TABLE 3

| | Ingredient | | | | | |
|---|---|---|---|---|---|---|
| Example No. | TiO$_2$ | Carrier Resin | Wax 1 | Wax 2 | PE Copolymer | Antioxidant |
| C1 | 70 wt. % | 30 wt. % | — | — | — | 200 ppm |
| C2 | 70 wt. % | 15 wt. % | 15 wt. % | — | — | 200 ppm |
| C3 | 70 wt. % | 15 wt. % | — | 15 wt. % | — | 200 ppm |
| E4 | 70 wt. % | 15 wt. % | — | — | 15 wt. % | 200 ppm |
| C5 | 70 wt. % | 20 wt. % | 10 wt. % | — | — | 200 ppm |
| C6 | 70 wt. % | 20 wt. % | — | 10 wt. % | — | 200 ppm |
| E7 | 70 wt. % | 20 wt. % | — | — | 10 wt. % | 200 ppm |
| C8 | 80 wt. % | 20 wt. % | — | — | — | 200 ppm |
| C9 | 80 wt. % | 10 wt. % | 10 wt. % | — | — | 200 ppm |
| C10 | 80 wt. % | 10 wt. % | — | 10 wt. % | — | 200 ppm |
| E11 | 80 wt. % | 10 wt. % | — | — | 10 wt. % | 200 ppm |
| E12 | 80 wt. % | — | — | — | 20 wt. % | 200 ppm |

TABLE 4

| | Example No. | | | | | |
|---|---|---|---|---|---|---|
| | C1 | C2 | C3 | E4 | C5 | C6 |
| Screw Configuration | | | | | | |
| Die | Strand 2 * 2.8 mm | Strand 2 * 2.8 mm | Strand 2 * 2.8 mm | Strand 2 * 2.8 mm | Strand 2 * 2.8 mm | Strand 2 * 2.8 mm |
| Compounding Conditions | | | | | | |
| Cooled Hopper Piece (Barrel 1) | Yes | Yes | Yes | Yes | Yes | Yes |
| Feed Rate (kg/hour) | 14 | 14 | 14 | 14 | 14 | 14 |

TABLE 4-continued

|  |  |  |  |  |  |  |
|---|---|---|---|---|---|---|
| SEI (KWh/kg) | 0.09 | 0.13 | 0.12 | 0.10 | 0.13 | 0.10 |
| nZSK (1/min %) | 200 | 200 | 200 | 200 | 200 | 200 |
| mdZSK (Torque) | 13 | 18 | 15 | 13 | 19 | 15 |
| Temperature Profile Zone Numbers | | | | | | |
| 1 | Cooled | Cooled | Cooled | Cooled | Cooled | Cooled |
| 2 | 170 | 170 | 170 | 170 | 170 | 170 |
| 3 | 180 | 180 | 180 | 180 | 180 | 180 |
| 4 | 180 | 190 | 190 | 190 | 190 | 190 |
| 5 | 180 | 190 | 190 | 190 | 190 | 190 |
| 6 | 180 | 190 | 190 | 190 | 190 | 190 |
| 7 | 180 | 190 | 190 | 190 | 190 | 190 |
| 8 | 180 | 190 | 190 | 190 | 190 | 190 |
| 9 | 190 | 190 | 190 | 190 | 190 | 190 |
| 10 | 190 | 190 | 190 | 190 | 190 | 190 |
| 11 | 190 | 190 | 190 | 190 | 190 | 190 |
| 12 | 190 | 190 | 190 | 190 | 190 | 190 |
| 13 | 190 | 190 | 190 | 190 | 190 | 190 |
| C-Clamp | 190 | 190 | 190 | 190 | 190 | 190 |
| Die Plate | 190 | 190 | 190 | 200 | 190 | 200 |
| Construction Barrel Zone | | | | | | |
| Barrel 1: | Feed zone | Feed zone | Feed zone | Feed zone | Feed zone | Feed zone |
| Barrel 2: | Closed | Closed | Closed | Closed | Closed | Closed |
| Barrel 3: | Closed | Closed | Closed | Closed | Closed | Closed |
| Barrel 4: | Closed | Closed | Closed | Closed | Closed | Closed |
| Barrel 5: | Side feeder | Side feeder | Side feeder | Side feeder | Side feeder | Side feeder |
| Barrel 6: | Closed | Closed | Closed | Closed | Closed | Closed |
| Barrel 7: | Closed | Closed | Closed | Closed | Closed | Closed |
| Barrel 8: | Closed | Closed | Closed | Closed | Closed | Closed |
| Barrel 9: | Closed | Closed | Closed | Closed | Closed | Closed |
| Barrel 10: | Closed | Closed | Closed | Closed | Closed | Closed |
| Barrel 11: | Closed | Closed | Closed | Closed | Closed | Closed |
| Barrel 12: | Closed | Closed | Closed | Closed | Closed | Closed |
| Barrel 13: | Closed | Closed | Closed | Closed | Closed | Closed |
| Side Feeder (rpm) | Barrel 5 250 | Barrel 5 250 | Barrel 5 250 | Barrel 5 250 | Barrel 5 250 | Barrel 5 250 |
| GALA™ Pelletizer | | | | | | |
| Die | 2 * 2.8 mm | 2 * 2.8 mm | 2 * 2.8 mm | 2 * 2.8 mm | 2 * 2.8 mm | 2 * 2.8 mm |
| RPM | 1200 | 2000 | 2000 | 2500 | 2500 | 2500 |
| Blades | 3 | 3 | 3 | 3 | 3 | 3 |
| Size Blades | Small | Small | Small | Small | Small | Small |
| Diverter valve temp. (° C.) | 190 | 190 | 190 | 200 | 190 | 200 |

|  | Example No. | | | | | |
|---|---|---|---|---|---|---|
|  | E7 | C8 | C9 | C10 | E11 | E12 |
| Screw Configuration | | | | | | |
| Die | Strand 2 * 2.8 mm | Strand 2 * 2.8 mm | Strand 2 * 2.8 mm | Strand 2 * 2.8 mm | Strand 2 * 2.8 mm | Strand 2 * 2.8 mm |
| Compounding Conditions | | | | | | |
| Cooled Hopper Piece (Barrel 1) | Yes | Yes | Yes | Yes | Yes | Yes |
| Feed Rate (kg/hour) | 14 | 14 | 14 | 14 | 14 | 14 |
| SEI (KWh/kg) | 0.08 | 0.13 | 0.22 | 0.25 | 0.12 | 0.12 |

TABLE 4-continued

| | | | | | | |
|---|---|---|---|---|---|---|
| nZSK (1/min %) | 200 | 200 | 200 | 200 | 200 | 200 |
| mdZSK (Torque) | 13 | 20 | 34 | 36 | 18 | 13 |
| Temperature Profile Zone Numbers | | | | | | |
| 1 | Cooled | Cooled | Cooled | Cooled | Cooled | Cooled |
| 2 | 170 | 170 | 170 | 180 | 180 | 160 |
| 3 | 180 | 180 | 180 | 180 | 180 | 160 |
| 4 | 190 | 190 | 190 | 190 | 190 | 170 |
| 5 | 190 | 190 | 190 | 190 | 190 | 170 |
| 6 | 190 | 190 | 190 | 190 | 190 | 170 |
| 7 | 190 | 190 | 190 | 190 | 190 | 170 |
| 8 | 190 | 190 | 190 | 190 | 190 | 160 |
| 9 | 190 | 190 | 190 | 190 | 190 | 160 |
| 10 | 190 | 190 | 190 | 190 | 190 | 150 |
| 11 | 190 | 190 | 190 | 190 | 190 | 140 |
| 12 | 190 | 190 | 190 | 190 | 190 | 140 |
| 13 | 190 | 190 | 190 | 190 | 190 | 120 |
| C-Clamp | 190 | 190 | 190 | 190 | 190 | 120 |
| Die Plate | 200 | 200 | 200 | 200 | 200 | 120 |
| Construction Barrel Zone | | | | | | |
| Barrel 1: | Feed zone | Feed zone | Feed zone | Feed zone | Feed zone | Feed zone |
| Barrel 2: | Closed | Closed | Closed | Closed | Closed | Closed |
| Barrel 3: | Closed | Closed | Closed | Closed | Closed | Closed |
| Barrel 4: | Closed | Closed | Closed | Closed | Closed | Closed |
| Barrel 5: | Side feeder | Side feeder | Side feeder | Side feeder | Side feeder | Side feeder |
| Barrel 6: | Closed | Closed | Closed | Closed | Closed | Closed |
| Barrel 7: | Closed | Closed | Closed | Closed | Closed | Closed |
| Barrel 8: | Closed | Closed | Closed | Closed | Closed | Closed |
| Barrel 9: | Closed | Closed | Closed | Closed | Closed | Closed |
| Barrel 10: | Closed | Closed | Closed | Closed | Closed | Closed |
| Barrel 11: | Closed | Closed | Closed | Closed | Closed | Closed |
| Barrel 12: | Closed | Closed | Closed | Closed | Closed | Closed |
| Barrel 13: | Closed | Closed | Closed | Closed | Closed | Closed |
| Side Feeder (rpm) | Barrel 5 250 | Barrel 5 250 | Barrel 5 250 | Barrel 5 250 | Barrel 5 250 | Barrel 5 250 |
| GALA™ Pelletizer | | | | | | |
| Die | 2 * 2.8 mm | 2 * 2.8 mm | 2 * 2.8 mm | 2 * 2.8 mm | 2 * 2.8 mm | 2 * 2.8 mm |
| RPM | 2500 | 2300 | 2300 | 2300 | 2300 | 2300 |
| Blades | 3 | 3 | 3 | 3 | 3 | 3 |
| Size Blades | Small | Small | Small | Small | Small | Small |
| Diverter valve temp. (° C.) | 200 | 200 | 200 | 200 | 200 | 120 |

As shown in Table 3, examples E4, E5, E11, and E12 comprise the propylene-ethylene copolymer described in the masterbatch compositions of the present disclosure with various amounts of carrier resin, if included. Comparative examples C1-C3, C5, C6, and C8-C10 include a traditional processing wax and comprise no propylene-ethylene copolymer.

As shown in Table 3, two different loading levels of TiO2 were prepared for evaluation, namely 70 wt. % and 80 wt. %. In all examples except for E12, the ratio of Carrier Resin to Wax/PE Copolymer was either 2:1 or 1:1. Notably, example E12 is a masterbatch composition according to one or more embodiments of the present disclosure in which no Carrier Resin is included, but instead was evaluated to determine the feasibility of using the PE Copolymer as the sole carrier encapsulating the TiO2 pigment.

For purposes of convenience, the various specific test descriptions used for testing examples 1-12 described hereinbelow are identified in Table 5. It is to be understood that a person of ordinary skill in the art may use various other published or well-recognized test methods to determine a particular property of the masterbatch and end-use polymer compositions described herein, without departing from the scope of the present disclosure. Each claim should be construed to cover the results of any of such procedures, even to the extent different procedures may yield different results or measurement values.

TABLE 5

| Property | Testing Descriptions |
|---|---|
| Apparent Viscosity | Equipment: GOTTFERT Rheotester 1000 |
| | Die: 30/1 |
| | Temperature: 190° C. |
| | Shear rates: 50 → 1000 sec−1 |
| | Testing software: WEBRHEO |
| | Evaluation software: WINRHEO II |
| | Correction: RABINOWITSCH |
| | (Based on Exxon Mobil RHE01-3.2) |
| CIELAB | D65 Illuminant |
| | 10° Observer |
| | RSEX |
| | (Based on ExxonMobil TPE 0135) |

TABLE 5-continued

| Property | Testing Descriptions |
|---|---|
| Elastic Modulus | Temperature: RT |
| Yield Point | (Based on ISO 527-2, Type 1A) |
| Elongation at Yield | |
| Elongation at Break | |
| Notched Izod Impact | Temperatures: RT, −20° C. |
| | (Based on ISO 180) |
| Opacity | Equipment: HUNTERLAB Dual Beam |
| | Spectrophotometer ULTRASCAN XE-2096 |
| | D65 Illuminant |
| | 10° Observer |
| | TTRAN |

Figure 2:
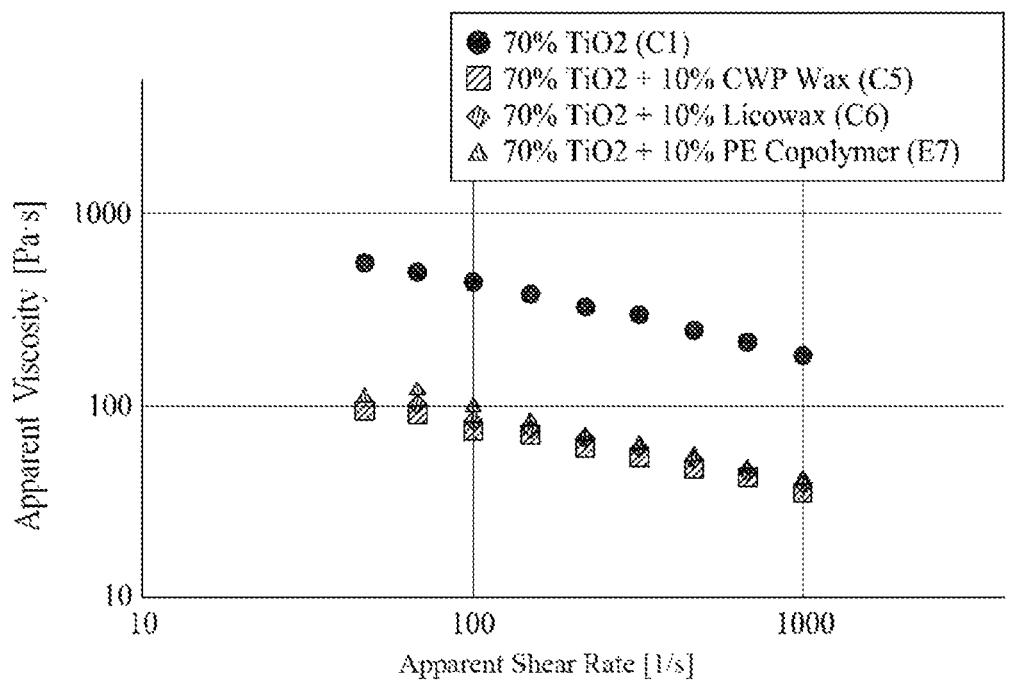
Figure 3:
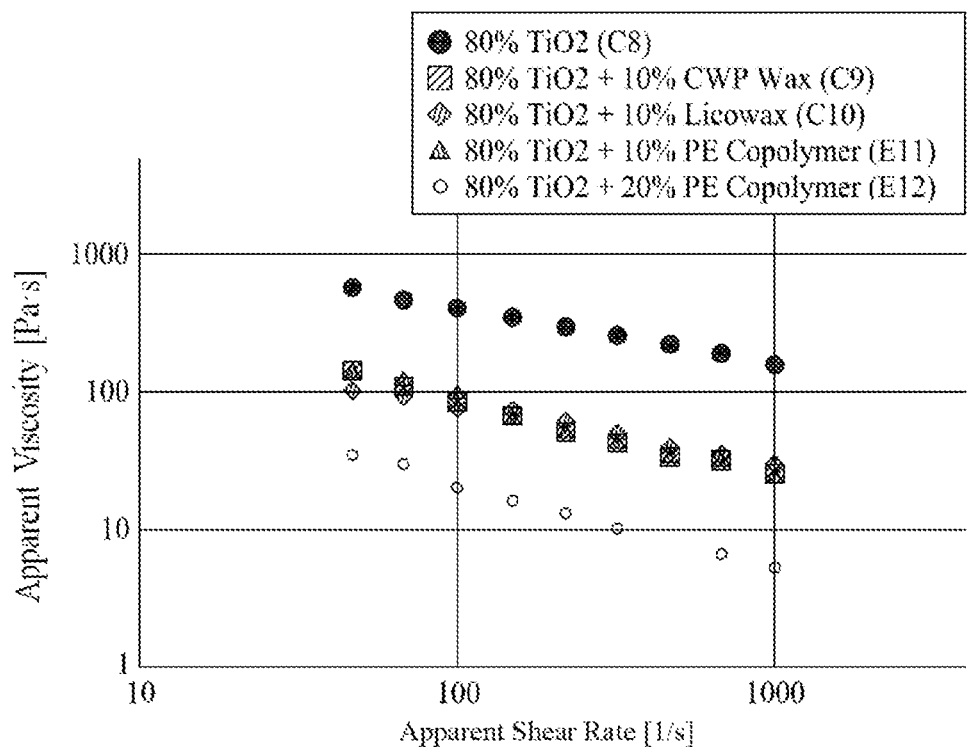

The apparent viscosity at 190° C. for each of examples 1-12 where tested according to the test description provided in Table 5. Table 6 and FIG. 1 shows the apparent viscosity of examples C1 having 70% TiO2 and no processing aid, and C2, C3, and E4 having 70% TiO2 and 1:1 Carrier Resin to Wax or PE Copolymer at various shear rates. Table 7 and FIG. 2 illustrates the apparent viscosity of examples C1 having 70% TiO2 and no processing aid, and C5, C6, and E7 having 70% TiO2 and 2:1 Carrier Resin to Wax or PE Copolymer at various shear rates. Table 8 and FIG. 3 shows the apparent viscosity of examples C8 having 80% TiO2 and no processing aid, C9, C10, and E11 having 80% TiO2 and 1:1 Carrier Resin to Wax or PE Copolymer, and E12 having 80% TiO2 and no Carrier Resin (only PE Copolymer) at various shear rates.

TABLE 6

| | | Shear Rate (s$^{-1}$) | | | | | | | | |
|---|---|---|---|---|---|---|---|---|---|---|
| | | 47 | 68 | 100 | 150 | 220 | 320 | 470 | 680 | 1000 |
| Apparent Viscosity (Pa · s) | C1 | 554 | 497 | 444 | 380 | 335 | 303 | 251 | 218 | 184 |
| | C2 | 26 | 71.8 | 57 | 48.8 | 42.5 | 36.9 | 31.2 | 27.5 | 22.8 |
| | C3 | 104 | 89.8 | 73.2 | 57 | 46.2 | 40.7 | 35.5 | 29.3 | 25.2 |
| | | 77.9 | | 69.2 | | 46.2 | | 34.6 | | 24.4 |
| | | | | | | | | | | 24.8 |
| | E4 | 60.6 | 47.9 | 40.7 | 29.8 | 25.9 | 21.6 | 19.9 | 17.4 | 15.9 |
| | | | | | | | | | | 15.5 |

TABLE 7

| | | Shear Rate (s$^{-1}$) | | | | | | | | |
|---|---|---|---|---|---|---|---|---|---|---|
| | | 47 | 68 | 100 | 150 | 220 | 320 | 470 | 680 | 1000 |
| Apparent Viscosity (Pa · s) | C1 | 554 | 497 | 444 | 380 | 335 | 303 | 251 | 218 | 184 |
| | C5 | 95.2 | 89.8 | 77.3 | 70.5 | 61 | 53.4 | 46.7 | 41.3 | 34.6 |
| | | | | | | | | | | 35 |
| | C6 | 34.6 | 102 | 85.5 | 78.7 | 68.4 | 59.8 | 52.8 | 46.1 | 39.5 |
| | | | | | | | | | | 39.5 |
| | E7 | 113 | 126 | 102 | 86.8 | 70.3 | 63.6 | 54.5 | 47.9 | 42.3 |

TABLE 8

| | | Shear Rate (s$^{-1}$) | | | | | | | | |
|---|---|---|---|---|---|---|---|---|---|---|
| | | 47 | 68 | 100 | 150 | 220 | 320 | 470 | 680 | 1000 |
| Apparent Viscosity (Pa · s) | C8 | 571 | 473 | 415 | 350 | 301 | 261 | 224 | 191 | 161 |
| | | | | | | | | | | 159 |
| | C9 | 139 | 108 | 85.5 | 67.8 | 53.6 | 44.5 | 34.6 | 31.7 | 24.4 |
| | | | | | | | | | | 26.4 |
| | C10 | 104 | 95.8 | 77.3 | 67.8 | 53.6 | 47 | 39 | 34.1 | 28.5 |
| | | | | | | | | | | 28.9 |
| | E11 | 47 | 114 | 89.5 | 70.5 | 57.3 | 49.6 | 39.8 | 35.9 | 31.3 |
| | E12 | 34.6 | 29.9 | 20.3 | 16.3 | 12.9 | 10.2 | — | 6.58 | 5.29 |

As shown in Tables 6-8 and FIGS. 1-3, use of the PE Copolymer exhibits comparable or enhanced viscosity modification effect (i.e., reduction in viscosity for processing) compared to comparative formulations with no processing aid, as well as comparative formulations comprising the traditional processing waxes (Wax 1 or Wax 2). Moreover, even greater viscosity modification was observed when the PE Copolymer was used as both a processing aid and a carrier resin. This viscosity modification effect was observed despite the PE Copolymer having markedly higher viscosity prior to its use in forming the masterbatch compositions (see Table 2).

The CIELAB color coordinates (L*, a*, b*) were determined on compression molded samples of circa 2 mm thickness for each of the masterbatch formulations of examples 1-12, determined according to the test description provided in Table 5. The CIELAB color coordinates for examples 1-12 are provided in Table 8.

TABLE 9

|  | L* | a* | b* |
|---|---|---|---|
| C1 | 96.60 | −0.94 | 1.88 |
| C2 | 95.83 | −0.99 | 1.73 |
| C3 | 96.31 | −1.05 | 1.89 |
| E4 | 95.74 | −0.97 | 2.29 |
| C5 | 96.39 | −0.97 | 1.71 |
| C6 | 97.14 | −0.98 | 1.73 |
| E7 | 95.70 | −0.72 | 2.52 |
| C8 | 97.03 | −0.95 | 2.21 |
| C9 | 94.86 | −1.09 | 2.10 |
| C10 | 96.34 | −1.10 | 1.80 |
| E11 | 97.31 | −1.00 | 2.26 |
| E12 | 95.75 | −1.19 | 1.33 |

As shown in Table 9, the masterbatch compositions prepared according to the present disclosure (i.e., E4, E7, E11, and E12) exhibit comparable CIELAB color coordinates and, in particular, whiteness as determined by L*.

Various end-use polymer composition were prepared using examples 1-12 to compare the CIELAB color coordinates of an end-use polymer composition according to the present disclosure with traditional end-use polymer formulations (e.g., same color and/or opacity in a final plastic part, and the like. Each of examples 1-12 were dry-blended with three (3) different polyolefin host polymers in an amount of 5% masterbatch formulation by weight. The polyolefin host polymers are provided in Table 10, and various characteristics thereof are provided in Table 11, including density, melt flow rate (MFR) of 2.16 kilograms (kg) at 230° C., and melt index (MI) at 2.16 kg at 190° C., where applicable.

TABLE 10

| Ingredient | Ingredient Type | Commercial Name | Reference Name |
|---|---|---|---|
| PP Random Copolymer | Host Polymer | PP9074MED (ExxonMobil Chemical Co.) | PP9074 |
| PP Homopolymer | Host Polymer | PP3155 (ExxonMobil Chemical Co.) | PP3155 |
| Low-Density Polyethylene | Host Polymer | LLDPE LL 6101XR (ExxonMobil Chemical Co.) | 6101XR |

TABLE 11

| Reference Name | Density (g/cm³) | MFR [2.16 kg/230° C.] (g/10 min) | MI [2.16 kg/190° C.] (g/10 min) |
|---|---|---|---|
| PP9074 | 0.9 | 24 | — |
| PP3155 | 0.9 | 36 | — |
| 6101XR | 0.924 | — | 20 |

The CIELAB color coordinates (L*, a*, b*) were determined for each of examples 1-12 with 5% masterbatch loading of PP9074 host polymer, PP3155 host polymer, and 6101XR host polymer, as provided in Tables 12-14, respectively.

TABLE 12

|  | L* | a* | b* |
|---|---|---|---|
| C1 + PP9074 | 97.00 | −0.85 | 1.57 |
| C2 + PP9074 | 97.06 | −0.86 | 1.54 |
| C3 + PP9074 | 97.33 | −0.82 | 1.40 |
| E4 + PP9074 | 97.09 | −0.74 | 1.61 |
| C5 + PP9074 | 97.20 | −0.74 | 1.46 |
| C6 + PP9074 | 97.12 | −0.84 | 1.47 |
| E7 + PP9074 | 96.99 | −0.69 | 1.68 |
| C8 + PP9074 | 97.29 | −0.76 | 1.42 |
| C9 + PP9074 | 96.92 | −0.85 | 1.45 |
| C10 + PP9074 | 97.35 | −0.78 | 1.35 |
| E11 + PP9074 | 97.09 | −0.72 | 1.52 |
| E12 + PP9074 | 97.13 | −0.80 | 1.37 |

TABLE 13

|  | L* | a* | b* |
|---|---|---|---|
| C1 + PP3155 | 97.11 | −0.83 | 1.62 |
| C2 + PP3155 | 97.37 | −0.93 | 1.73 |
| C3 + PP3155 | 96.97 | −0.81 | 1.76 |
| E4 + PP3155 | 97.11 | −0.86 | 1.54 |
| C5 + PP3155 | 96.91 | −0.78 | 1.75 |
| C6 + PP3155 | 97.14 | −0.84 | 1.64 |
| E7 + PP3155 | 96.42 | −0.63 | 1.90 |
| C8 + PP3155 | 96.90 | −0.77 | 1.71 |
| C9 + PP3155 | 97.20 | −0.89 | 1.67 |
| C10 + PP3155 | 96.78 | −0.75 | 1.79 |
| E11 + PP3155 | 97.13 | −0.80 | 1.52 |
| E12 + PP3155 | 95.65 | −0.55 | 2.17 |

TABLE 14

|  | L* | a* | b* |
|---|---|---|---|
| C1 + 6101XR | 97.02 | −0.81 | 1.47 |
| C2 + 6101XR | 97.18 | −0.80 | 1.40 |
| C3 + 6101XR | 97.23 | −0.78 | 1.48 |
| E4 + 6101XR | 97.14 | −0.78 | 1.44 |
| C5 + 6101XR | 97.20 | −0.77 | 1.42 |
| C6 + 6101XR | 97.26 | −0.79 | 1.44 |
| E7 + 6101XR | 96.97 | −0.67 | 1.53 |
| C8 + 6101XR | 97.00 | −0.76 | 1.24 |
| C9 + 6101XR | 97.16 | −0.79 | 1.37 |
| C10 + 6101XR | 97.30 | −0.77 | 1.40 |
| E11 + 6101XR | 97.12 | −0.74 | 1.39 |
| E12 + 6101XR | 96.97 | −0.78 | 1.28 |

As shown in Tables 12-14, use of the PE Copolymer comprising masterbatch compositions of the present disclosure (i.e., E4, E7, E11, and E12) for forming end-use polymer compositions does not negatively, and negligently if at all, influence CIELAB color coordinates compared to traditional formulations and, in particular, whiteness as determined by L*. Accordingly, the propylene-ethylene copolymer described herein (e.g., VISTAMAX™ 8880) can be wholly substituted for traditional processing waxes (and in some instances a carrier resin, as well), particularly in combination with TiO2 pigment, for forming masterbatch compositions and end-use product composition without compromising color.

Various physical properties of the end-use product formulations (i.e., examples 1-12+PP9074, examples 1-12+PP3155, and examples 1-12+6101XR) were further determined, including elastic modulus (unit: MPa), yield point (unit: MPa), elongation at yield (unit: %), and elongation at break (unit: %), as determined according to the test descriptions provided in Table 5. These properties were further compared to the physical properties applicable host polymer itself (neat). The standard deviation (SD) is provided for each measurement (reported as: ±). The results are shown in Tables 15-17 for end-use polymer formulations comprising PP9074, PP3155, and 6101XR, respectively.

TABLE 15

|  | Modulus (MPa) | Yield Point (MPa) | Elongation at Yield (%) | Elongation at Break (%) |
| --- | --- | --- | --- | --- |
| PP9074 (neat) | 1011.49 | 27.06 | 12.79 | 497.73 |
|  | (±31.36) | (±0.74) | (±0.19) | (±76.26) |
| C1 + PP9074 | 998.77 | 25.95 | 12.12 | 303.39 |
|  | (±12.01) | (±0.13) | (±0.18) | (±60.86) |
| C2 + PP9074 | 980.57 | 25.76 | 12.34 | 511.60 |
|  | (±23.02) | (±0.41) | (±0.20) | (±109.12) |
| C3 + PP9074 | 1002.15 | 26.06 | 12.44 | 489.77 |
|  | (±13.29) | (±0.20) | (±0.17) | (±67.86) |
| E4 + PP9074 | 981.34 | 25.48 | 12.16 | 511.01 |
|  | (±12.71) | (±0.15) | (±0.28) | (±108.47) |
| C5 + PP9074 | 1005.50 | 26.06 | 12.05 | 453.55 |
|  | (±14.87) | (±0.28) | (±0.19) | (±194.04) |
| C6 + PP9074 | 995.81 | 25.75 | 12.35 | 367.20 |
|  | (±5.81) | (±0.13) | (±0.12) | (±32.38) |
| E7 + PP9074 | 998.18 | 25.99 | 12.34 | 543.30 |
|  | (±7.43) | (±0.14) | (±0.05) | (±48.27) |
| C8 + PP9074 | 1016.35 | 25.74 | 11.89 | 382.36 |
|  | (±15.41) | (±0.18) | (±0.21) | (±27.90) |
| C9 + PP9074 | 1023.85 | 26.23 | 12.25 | 480.32 |
|  | (±15.02) | (±0.20) | (±0.08) | (±74.85) |
| C10 + PP9074 | 991.35 | 26.21 | 12.48 | 534.36 |
|  | (±17.19) | (±0.35) | (±0.09) | (±49.70) |
| E11 + PP9074 | 1063.61 | 26.29 | 11.81 | 426.72 |
|  | (±33.27) | (±0.29) | (±0.24) | (±153.53) |
| E12 + PP9074 | 1046.87 | 26.54 | 12.32 | 584.75 |
|  | (±43.96) | (±0.23) | (±0.16) | (±30.33) |

TABLE 16

|  | Modulus (MPa) | Yield Point (MPa) | Elongation at Yield (%) | Elongation at Break (%) |
| --- | --- | --- | --- | --- |
| PP3155 (neat) | 1355.62 | 32.88 | 9.54 | 412.81 |
|  | (±63.46) | (±0.44) | (±0.04) | (±96.69) |
| C1 + PP3155 | 1571.13 | 33.67 | 8.29 | 184.00 |
|  | (±13.76) | (±0.22) | (±0.08) | (±46.46) |
| C2 + PP3155 | 1400.95 | 32.00 | 9.57 | 380.83 |
|  | (±50.55) | (±0.34) | (±0.14) | (±93.60) |
| C3 + PP3155 | 1332.11 | 31.32 | 9.60 | 377.88 |
|  | (±35.75) | (±0.15) | (±0.12) | (±49.79) |
| E4 + PP3155 | 1433.03 | 32.49 | 9.23 | 311.05 |
|  | (±38.71) | (±0.12) | (±0.06) | (±67.38) |
| C5 + PP3155 | 1429.66 | 32.34 | 9.28 | 400.43 |
|  | (±55.12) | (±0.19) | (±0.10) | (±73.47) |
| C6 + PP3155 | 1398.30 | 31.87 | 9.39 | 351.09 |
|  | (±55.73) | (±0.27) | (±0.08) | (±29.42) |
| E7 + PP3155 | 1547.58 | 33.62 | 8.41 | 177.07 |
|  | (±24.63) | (±0.22) | (±0.13) | (±65.83) |
| C8 + PP3155 | 1575.65 | 33.74 | 8.24 | 176.35 |
|  | (±26.26) | (±0.27) | (±0.06) | (±39.41) |

TABLE 16-continued

|  | Modulus (MPa) | Yield Point (MPa) | Elongation at Yield (%) | Elongation at Break (%) |
| --- | --- | --- | --- | --- |
| C9 + PP3155 | 1388.59 | 32.15 | 9.17 | 250.38 |
|  | (±79.39) | (±0.11) | (±0.16) | (±67.97) |
| C10 + PP3155 | 1359.32 | 31.89 | 9.36 | 377.02 |
|  | (±41.06) | (±0.22) | (±0.15) | (±109.27) |
| E11 + PP3155 | 1543.41 | 32.98 | 8.34 | 248.42 |
|  | (±24.44) | (±0.07) | (±0.04) | (±96.33) |
| E12 + PP3155 | 1609.54 | 34.06 | 8.29 | 261.68 |
|  | (±13.92) | (±0.19) | (±0.06) | (±108.63) |

TABLE 17

|  | Modulus (MPa) | Yield Point (MPa) | Elongation at Yield (%) | Elongation at Break (%) |
| --- | --- | --- | --- | --- |
| 6101XR (neat) | 285.07 | 10.14 | 17.35 | 506.42 |
|  | (±7.38) | (±0.13) | (±0.23) | (±25.98) |
| C1 + 6101XR | 339.83 | 10.72 | 13.95 | 274.94 |
|  | (±4.75) | (±0.05) | (±0.18) | (±86.29) |
| C2 + 6101XR | 334.98 | 10.83 | 14.79 | 401.78 |
|  | (±5.36) | (±0.09) | (±0.10) | (±31.54) |
| C3 + 6101XR | 319.88 | 10.54 | 15.20 | 437.54 |
|  | (±5.81) | (±0.13) | (±0.35) | (±7.63) |
| E4 + 6101XR | 327.78 | 10.45 | 14.64 | 297.26 |
|  | (±1.89) | (±0.06) | (±0.27) | (±55.68) |
| C5 + 6101XR | 339.06 | 10.86 | 14.85 | 378.51 |
|  | (±3.04) | (±0.06) | (±0.20) | (±63.99) |
| C6 + 6101XR | 647.00 | 10.60 | 14.92 | 359.11 |
|  | (±3.13) | (±0.06) | (±0.28) | (±79.71) |
| E7 + 6101XR | 337.47 | 10.64 | 14.09 | 274.28 |
|  | (±3.76) | (±0.05) | (±0.16) | (±83.11) |
| C8 + 6101XR | 339.91 | 10.73 | 14.50 | 323.87 |
|  | (±2.24) | (±0.05) | (±0.28) | (±87.63) |
| C9 + 6101XR | 331.50 | 10.74 | 15.03 | 360.11 |
|  | (±6.26) | (±0.05) | (±0.15) | (±40.36) |
| C10 + 6101XR | 330.84 | 10.65 | 14.98 | 396.53 |
|  | (±4.75) | (±0.08) | (±0.19) | (±40.80) |
| E11 + 6101XR | 336.14 | 10.64 | 14.38 | 335.58 |
|  | (±1.52) | (±0.05) | (±0.16) | (±105.88) |
| E12 + 6101XR | 327.14 | 10.48 | 14.19 | 394.74 |
|  | (±12.70) | (±0.21) | (±0.30) | (±62.97) |

As shown in Tables 15-17, use of the PE Copolymer comprising masterbatch compositions of the present disclosure (i.e., E4, E7, E11, and E12) for forming end-use polymer compositions results in comparable, or negligible, physical properties as compared to traditional formulations. That is, it is evident that the propylene-ethylene copolymer modifies the properties of the host polymer in an at least comparable fashion as compared to the use of traditional processing waxes. Accordingly, the propylene-ethylene copolymer described herein can be substituted for traditional processing waxes (and in some instances a carrier resin, as well), particularly in combination with TiO2 pigment, for forming masterbatch compositions and end-use product composition without compromising desired physical properties.

The impact strength properties of the end-use product formulations (i.e., examples 1-12+PP9074, examples 1-12+PP3155, and examples 1-12+6101XR) were further determined, including notched Izod impact at RT (unit: kJ/m2) and notched Izod impact at −20° C. (unit: kJ/m2), as determined according to the test descriptions provided in Table 5. These properties were further compared to the impact strength of the host polymer itself (neat). The standard deviation (SD) is provided for each measurement (reported as: ±). The results are shown in Tables 18-20 for end-use polymer formulations comprising PP9074, PP3155, and 6101XR, respectively. The references in Tables 18-20 of "C," "H," and "P" refer to the type of break and "%" refers to the percentage of specimen which exhibited the particular type of break. "C" refers to a complete break, in which the specimen separates into two or more pieces. "H" refers to a hinge break, in which the specimen exhibits an incomplete break such that two parts of the specimen are held together only by a thin peripheral layer in the form of a hinge having low residual stiffness. "P" refers to a partial break, in which the specimen exhibits an incomplete break that does not meet the definition for a hinge break. Although not experienced in the Example described herein, the reference "N" would refer to a non-break, in which the specimen is only distorted, possible combined with stress whitening.

TABLE 18

|  | Izod Impact at RT (kJ/m$^2$) | | Izod Impact @ −20° C. (kJ/m$^2$) | |
| --- | --- | --- | --- | --- |
| PP9074 (neat) | 6.90 (±1.33) | 100% C | 3.80 (±1.65) | 100% C |
| C1 + PP9074 | 8.91 (±2.73) | 100% C | 2.58 (±0.09) | 100% C |
| C2 + PP9074 | 8.17 (±1.47) | 100% C | 5.45 (±2.42) | 100% C |
| C3 + PP9074 | 7.82 (±1.93) | 100% C | 3.33 (±1.30) | 100% C |
| E4 + PP9074 | 10.87 (±1.72) | 100% C | 2.51 (±0.12) | 100% C |
| C5 + PP9074 | 7.88 (±1.84) | 100% C | 6.26 (±2.77) | 100% C |
| C6 + PP9074 | 8.56 (±1.39) | 100% C | 2.46 (±0.09) | 100% C |
| E7 + PP9074 | 11.67 (±0.95) | 100% C | 2.53 (±0.16) | 100% C |
| C8 + PP9074 | 10.92 (±3.08) | 100% C | 2.52 (±0.23) | 100% C |
| C9 + PP9074 | 9.08 (±1.77) | 100% C | 3.33 (±1.17) | 100% C |
| C10 + PP9074 | 9.08 (±1.53) | 100% C | 3.53 (±2.54) | 100% C |
| E11 + PP9074 | 12.45 (±3.48) | 100% C | 2.40 (±0.20) | 100% C |
| E12 + PP9074 | 8.29 (±2.00) | 100% C | 2.74 (±0.14) | 100% C |

TABLE 19

|  | Izod Impact at RT (kJ/m$^2$) | | Izod Impact @ −20° C. (kJ/m$^2$) | |
| --- | --- | --- | --- | --- |
| PP3155 (neat) | 7.66 (±2.79) | 100% C | 5.98 (±2.05) | 100% C |
| C1 + PP3155 | 9.94 (±2.13) | 20% H 100% C | 2.96 (±0.57) | 100% C |
| C2 + PP3155 | 7.53 (±2.25) | 100% C | 2.55 (±0.22) | 100% C |
| C3 + PP3155 | 8.99 (±2.02) | 20% H 100% C | 3.50 (±1.63) | 100% C |
| E4 + PP3155 | 7.12 (±1.61) | 100% C | 4.42 (±2.11) | 100% C |
| C5 + PP3155 | 7.40 (±2.90) | 20% H 100% C | 3.72 (±2.62) | 100% C |
| C6 + PP3155 | 6.82 (±2.55) | 100% C | 2.93 (±0.33) | 100% C |
| E7 + PP3155 | 7.59 (±0.88) | 20% H 100% C | 3.75 (±1.36) | 100% C |
| C8 + PP3155 | 8.18 (±0.89) | 20% H 100% C | 2.93 (±0.23) | 100% C |
| C9 + PP3155 | 8.69 (±3.31) | 100% C | 2.66 (±0.23) | 100% C |
| C10 + PP3155 | 6.47 (±1.60) | 20% H 100% C | 5.32 (±3.58) | 100% C |
| E11 + PP3155 | 6.88 (±1.80) | 20% H 100% C | 4.13 (±2.24) | 100% C |
| E12 + PP3155 | 6.73 (±1.73) | 100% C | 2.65 (±0.25) | 100% C |

TABLE 20

|  | Izod Impact at RT (kJ/m$^2$) | | Izod Impact @ −20° C. (kJ/m$^2$) | |
| --- | --- | --- | --- | --- |
| 6101XR (neat) | 48.19 (±0.70) | 100% P | 23.15 (±8.08) | 20% P 80% C |
| C1 + 6101XR | 39.06 (±3.35) | 100% P | 17.44 (±2.77) | 100% C |
| C2 + 6101XR | 25.73 (±9.05) | 100% P | 16.48 (±3.19) | 100% C |
| C3 + 6101XR | 28.30 (±14.37) | 100% P | 21.36 (±4.80) | 100% C |
| E4 + 6101XR | 36.99 (±2.38) | 100% P | 9.54 (±2.69) | 100% C |
| C5 + 6101XR | 36.62 (±3.96) | 100% P | 24.40 (±6.36) | 100% C |
| C6 + 6101XR | 35.16 (±2.02) | 100% P | 24.29 (±4.15) | 100% C |
| E7 + 6101XR | 32.98 (±5.71) | 100% P | 13.19 (±3.91) | 100% C |
| C8 + 6101XR | 26.35 (±7.94) | 100% P | 11.69 (±1.11) | 100% C |
| C9 + 6101XR | 27.18 (±3.09) | 100% P | 22.44 (±4.07) | 100% C |
| C10 + 6101XR | 23.72 (±8.53) | 100% P | 16.96 (±3.98) | 100% C |
| E11 + 6101XR | 27.58 (±1.47) | 100% P | 14.42 (±1.06) | 100% C |
| E12 + 6101XR | 21.03 (±6.14) | 100% P | 12.85 (±4.90) | 100% C |

As shown in Tables 18-20, an additional advantage to the masterbatch compositions of the present disclosure is that the inclusion of the propylene-ethylene copolymer for forming the end-use polymer composition (and thus resultant plastic products or parts) is comparable or may be improved (higher) compared masterbatch formulations comprising traditional procession waxes, and also often as compared to the host polymer itself. FIGS. 4-8 visually illustrate the impact strength advantage for end-use polymer compositions comprising the masterbatch formulations of the present disclosure having a propylene-ethylene copolymer included.

Figure 4:
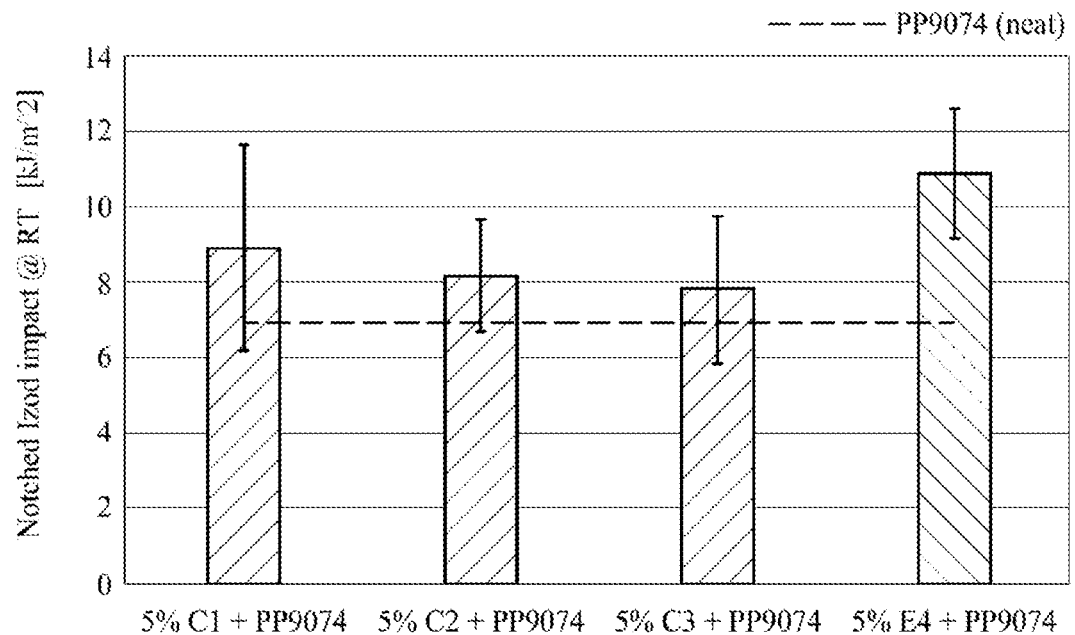
FIGS. 4-8 show notched Izod impact strength values for end-use polymer test specimens prepared using 5 wt. % masterbatch compositions according to one or more embodiments of the present disclosure and comparative masterbatch formulations and host polymers.
Figure 5:
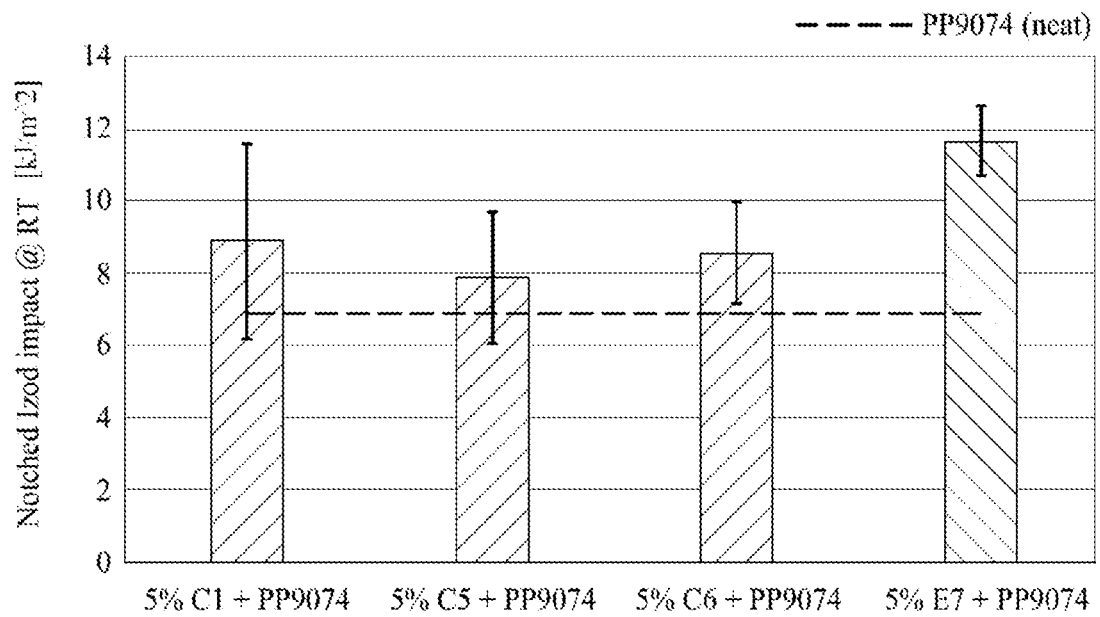
Figure 6:
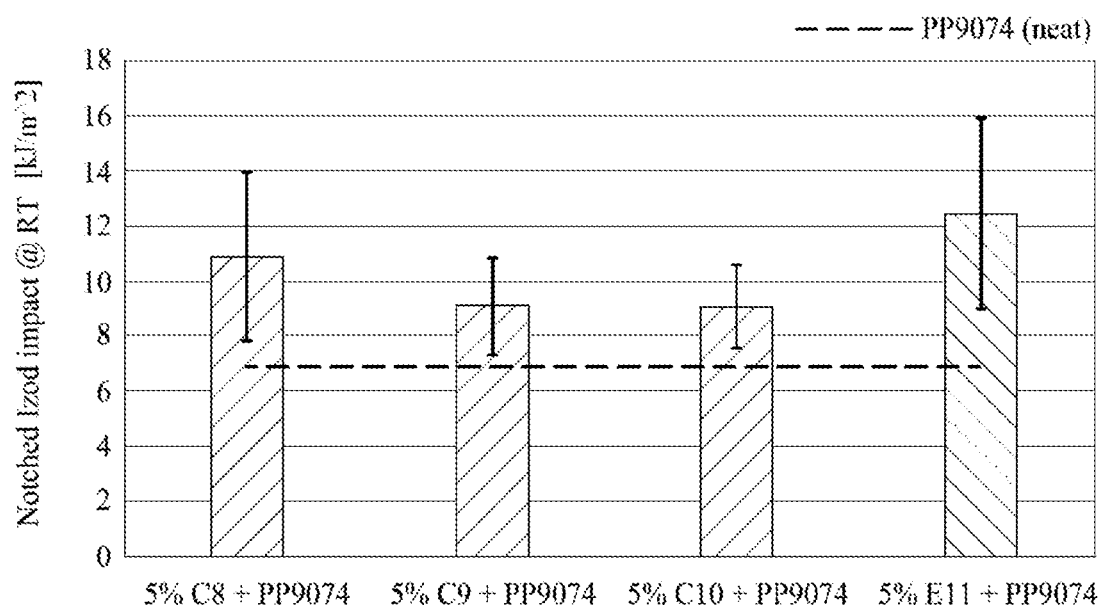

FIG. 4 shows the Izod impact at RT of end-use polymer compositions comprising PP9074 and 5% of examples C1 having 70% TiO2 and no processing aid, and C2, C3, and E4 having 70% TiO2 and 1:1 Carrier Resin to Wax or PE Copolymer. FIG. 5 illustrates the Izod impact at RT of end-use polymer compositions comprising PP9074 and 5% of examples C1 having 70% TiO2 and no processing aid, and C5, C6, and E7 having 70% TiO2 and 2:1 Carrier Resin to Wax or PE Copolymer. FIG. 6 shows the Izod impact at RT of end-use polymer compositions comprising PP9074 and 5% of examples C8 having 80% TiO2 and no processing aid, and C9, C10, and E11 having 80% TiO2 and 1:1 Carrier Resin to Wax or PE Copolymer.

Figure 7:
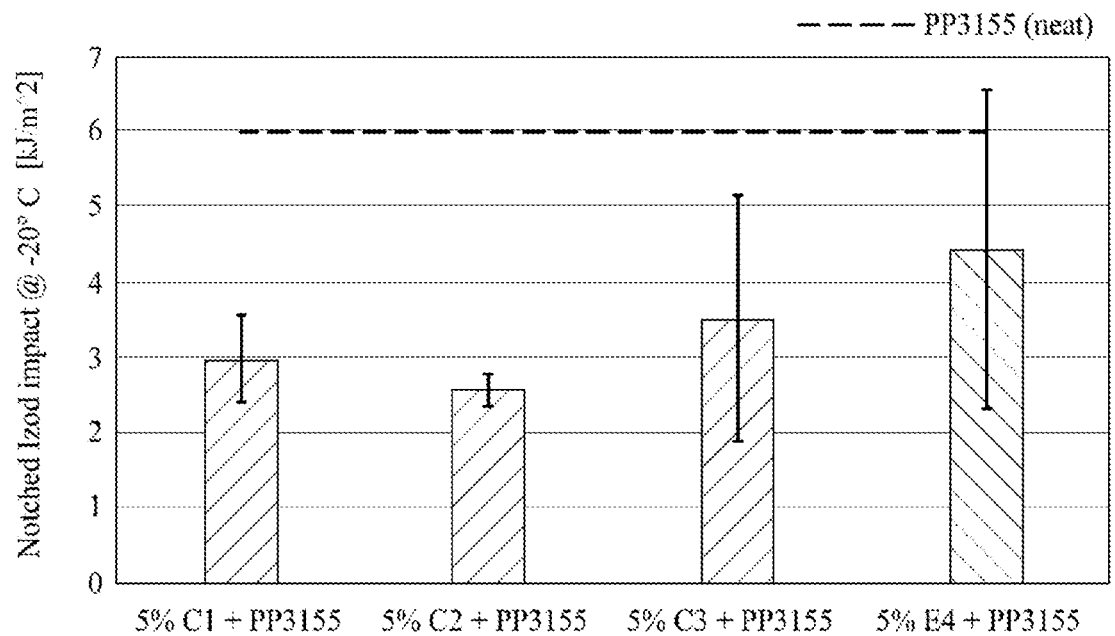

FIG. 7 illustrates the Izod impact at −20° C. of end-use polymer compositions comprising PP3155 and 5% of examples C1 having 70% TiO2 and no processing aid, and C2, C3, and E4 having 70% TiO2 and 1:1 Carrier Resin to Wax or PE Copolymer.

Figure 8:
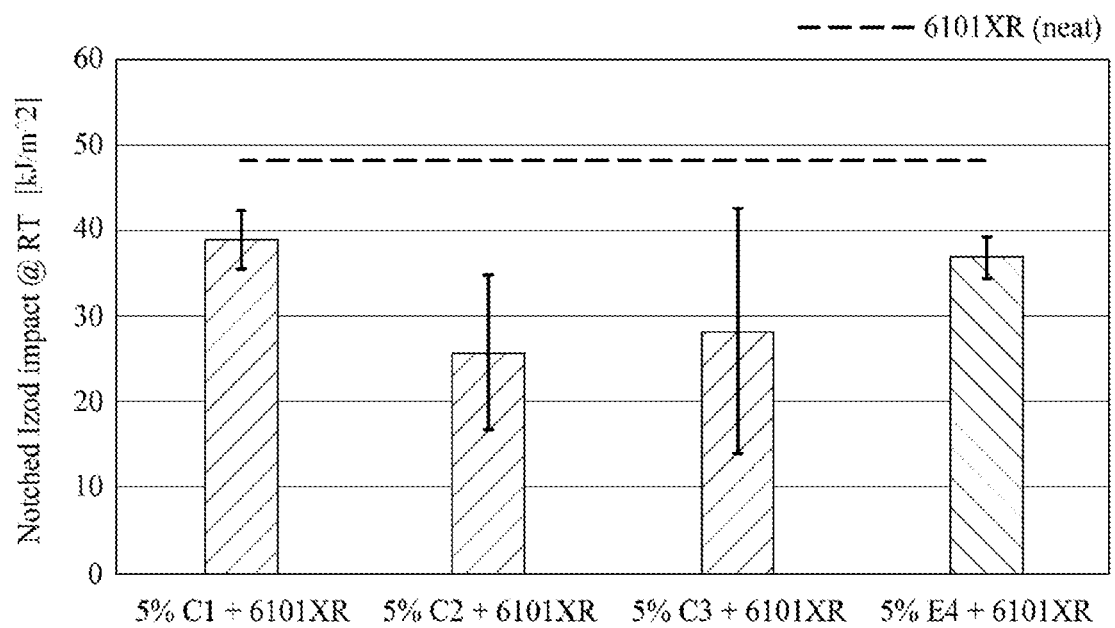

FIG. 8 illustrates the Izod impact at RT of end-use polymer compositions comprising 6101XR and 5% of examples C1 having 70% TiO2 and no processing aid, and C2, C3, and E4 having 70% TiO2 and 1:1 Carrier Resin to Wax or PE Copolymer.

Figure 9:
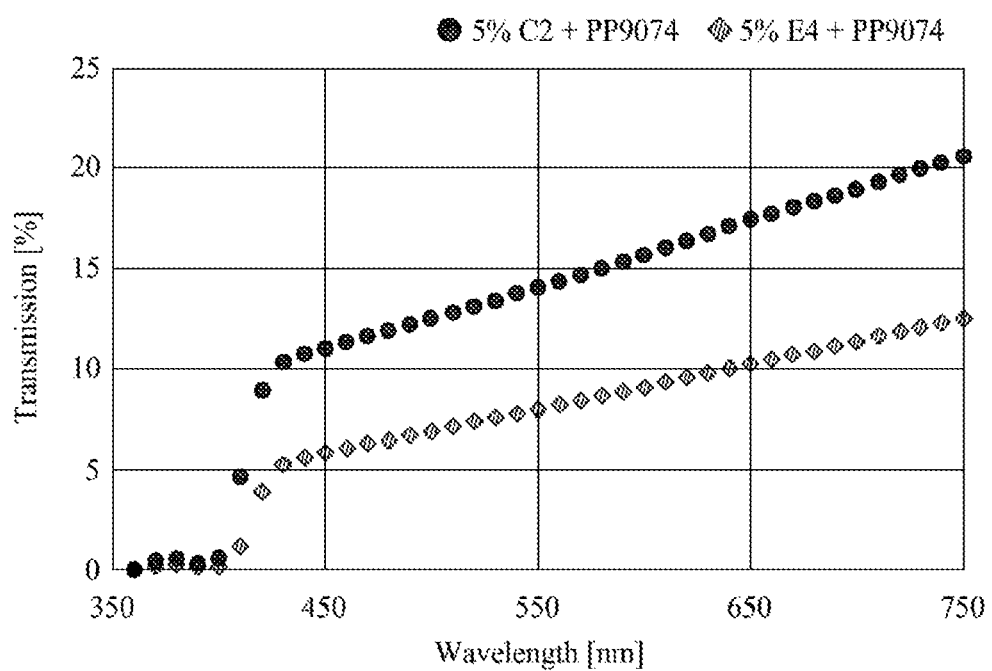
FIG. 9 shows opacity values for a 0.5 mm thick injection molded specimen of end-use polymer prepared using a 5 wt. % masterbatch composition according to one or more embodiments of the present disclosure and a comparative masterbatch formulation.

To further investigate the properties of the end-use polymer compositions comprising the masterbatch compositions of the present disclosure, 5% C2+PP9074 and 5% E4+PP9074 end-use polymer compositions were prepared according the methods described above and tested for opacity using an injection molded 0.5 mm thickness section. The transmission results are provided in Table 21 and visually illustrated in FIG. 9.

TABLE 21

| Wavelength (nanometers (nm)) | 0.5 mm of 5% C2 + PP9074 (%) | 0.5 mm of 5% E4 + PP9074 (%) |
|---|---|---|
| 360 | 0 | 0 |
| 370 | 0.44 | 0.06 |
| 380 | 0.49 | 0.24 |
| 390 | 0.24 | 0.13 |
| 400 | 0.53 | 0.09 |
| 410 | 4.63 | 1.12 |
| 420 | 8.96 | 3.83 |
| 430 | 10.34 | 5.23 |
| 440 | 10.75 | 5.56 |
| 450 | 11.02 | 5.79 |
| 460 | 11.35 | 6.04 |
| 470 | 11.64 | 6.22 |
| 480 | 11.92 | 6.4 |
| 490 | 12.22 | 6.65 |
| 500 | 12.5 | 6.89 |
| 510 | 12.81 | 7.1 |
| 520 | 13.1 | 7.32 |
| 530 | 13.39 | 7.53 |
| 540 | 13.73 | 7.75 |
| 550 | 14.04 | 7.96 |
| 560 | 14.35 | 8.18 |
| 570 | 14.68 | 8.39 |
| 580 | 15.01 | 8.62 |
| 590 | 15.33 | 8.84 |
| 600 | 15.68 | 9.07 |
| 610 | 16.02 | 9.29 |
| 620 | 16.38 | 9.53 |
| 630 | 16.72 | 9.77 |
| 640 | 17.06 | 10 |
| 650 | 17.4 | 10.23 |
| 660 | 17.7 | 10.45 |
| 670 | 18.03 | 10.68 |
| 680 | 18.29 | 10.85 |
| 690 | 18.63 | 11.11 |
| 700 | 18.95 | 11.33 |
| 710 | 19.32 | 11.58 |
| 720 | 19.64 | 11.81 |
| 730 | 19.98 | 12.05 |
| 740 | 20.28 | 12.25 |
| 750 | 20.55 | 12.43 |

As shown, the 0.5 mm thickness end-use polymer sample comprising the masterbatch composition of the present disclosure (i.e., example E4 having PE Copolymer) has an improved opacity compared to an end-use polymer sample of the same thickness prepared using a traditional processing wax. Indeed, the end-use polymer compositions comprising the masterbatch concentrations having TiO2 and propylene-ethylene copolymer may have an opacity of less than about 15%, or less than about 12%, or less across the visible light spectrum, the visible light spectrum being defined as about 390 nm to about 700 nm. In some embodiments, the opacity is at least improved compared to an end-use polymer comprising a masterbatch composition lacking the propylene-ethylene copolymer described herein, depending on one or more factors, such as the particular host polymer selected, the composition and concentration of the masterbatch compositions of the present disclosure (and any carrier resin and/or additives), and the like. Accordingly, the masterbatch compositions of the present disclosure may be particularly effective at reducing transmittance through final plastic products formed therewith (e.g., plastic rigid containers).

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments and examples illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A composition comprising:
   about 30% to about 85% by weight titanium dioxide;
   about 2% to about 20% by weight of a propylene-ethylene copolymer, the copolymer comprising about 2% to about 20% by weight ethylene content; and
   wherein the composition is free of a processing wax.

2. The composition of claim 1, wherein the composition comprises about 70% to about 80% by weight titanium dioxide.

3. The composition of claim 1, wherein the copolymer comprises about 4% to about 16% by weight ethylene content.

4. The composition of claim 1, wherein the copolymer comprises about 6% by weight ethylene content.

5. The composition of claim 1, wherein the copolymer has a viscosity of greater than about 500 Pa·s at 190° C.

6. The composition of claim 1, wherein the copolymer has a viscosity of about 1,200 Pa·s at 190° C.

7. The composition of claim 1, wherein the copolymer has a molecular weight of greater than about 10,000 g/mol.

8. The composition of claim 1, wherein the copolymer has a molecular weight of about 10,200 g/mol.

9. The composition of claim 1, wherein the composition includes a polyolefin carrier resin and the included polyolefin carrier resin is polyethylene.

10. The composition of claim 1, wherein the composition further comprises an additive selected from the group consisting of an antioxidant, a light stabilizer, a nucleating agent, a slip agent, an antiblocking agent, a lubricant, an antistatic agent, a molecular weight modifier, a dispersing aid, and any combination thereof.

11. The composition of claim 10, wherein the composition includes the antioxidant and the included antioxidant is a phenolic antioxidant.

12. The composition of claim 10, wherein the antioxidant is octadecyl-3-(3,5-di-tert.butyl-4-hydroxyphenyl)-propionate.

13. The composition of claim 1, wherein the apparent viscosity of the composition is less than about 10,000 Pa·s at a shear rate of 100 s$^{-1}$.

14. The composition of claim 1, wherein the apparent viscosity of the composition is in the range of about 110 Pa·s to about 15 Pa·s at a shear rate of 100 s$^{-1}$.

15. The composition of claim 1, wherein the composition has CIE L* color coordinate L* of greater than about 95.

* * * * *